(12) United States Patent
Burgess et al.

(10) Patent No.: US 8,414,722 B2
(45) Date of Patent: Apr. 9, 2013

(54) ROOFING APPARATUS

(75) Inventors: Scott Burgess, Wooster, OH (US); Jerry Beall, Wooster, OH (US)

(73) Assignee: Seaman Corporation, Wooster, OH (US)

( * ) Notice: Subject to any disclaimer, the term of this patent is extended or adjusted under 35 U.S.C. 154(b) by 0 days.

(21) Appl. No.: 13/277,660

(22) Filed: Oct. 20, 2011

(65) Prior Publication Data

US 2012/0267052 A1 Oct. 25, 2012

Related U.S. Application Data

(60) Provisional application No. 61/394,996, filed on Oct. 20, 2010.

(51) Int. Cl.
*E04F 13/00* (2006.01)
*B29C 65/02* (2006.01)
*B29C 65/10* (2006.01)
*B32B 37/04* (2006.01)
*B32B 37/06* (2006.01)
*B32B 37/22* (2006.01)
*B32B 39/00* (2006.01)
*B32B 43/00* (2006.01)

(52) U.S. Cl.
USPC ............. 156/71; 156/391; 156/499; 156/574; 156/579

(58) Field of Classification Search .................... 156/71, 156/391, 497, 499, 544, 574, 579
See application file for complete search history.

(56) References Cited

U.S. PATENT DOCUMENTS

| 5,254,203 | A | * | 10/1993 | Corston | ........................ 156/391 |
| 6,453,964 | B1 | | 9/2002 | Pfotenhauer et al. | |
| 6,866,077 | B2 | * | 3/2005 | Zurmuhle et al. | ............ 156/391 |

* cited by examiner

*Primary Examiner* — Sing P Chan
(74) *Attorney, Agent, or Firm* — Roetzel & Andress

(57) ABSTRACT

An apparatus for welding a synthetic strip to a roofing membrane that is attached to a roofing construct, the synthetic strip having a central raised portion that extends along the longitudinal length of the synthetic strip, the synthetic strip having flanges extending widthwise from the central raised portion, and the synthetic strip having a substantially planar underside portion, the apparatus having a self-propelled housing having a drive wheel for movably supporting the housing on the membrane; a first guide-wheel element mounted to the housing and positioned in or underneath the housing and the first guide-wheel element having a peripheral channel adapted to engage and receive the underside flat-planar portion of the synthetic strip and guide the synthetic strip, wherein the guide-wheel receiving channel has a channel width adapted to receive the total width of the synthetic strip.

9 Claims, 10 Drawing Sheets

US 8,414,722 B2

ROOFING APPARATUS

RELATED APPLICATION DATA

This application claims priority to and also incorporates by reference U.S. Provisional Patent Application No. 61/394,996, filed on Oct. 20, 2010, titled "Roofing Apparatus."

BACKGROUND OF THE INVENTION

Roofing structures and equipment are well known, but there still remains a need in the art for equipment and methods that accommodate relatively new types of roofing structures and associated methods of manufacture.

SUMMARY OF THE INVENTION

An apparatus for welding a synthetic strip to a roofing membrane that is attached to a roofing construct, the synthetic strip having a central raised portion that extends along the longitudinal length of the synthetic strip, the synthetic strip having flanges extending widthwise from the central raised portion, and the synthetic strip having a substantially planar underside portion, the apparatus comprising a self-propelled housing having a drive wheel for movably supporting the housing on the membrane; a first guide-wheel element mounted to the housing and positioned in or underneath the housing and the first guide-wheel element having a peripheral channel adapted to engage and receive the underside flat-planar portion of the synthetic strip and guide the synthetic strip, wherein the guide-wheel receiving channel has a channel width adapted to receive the total width of the synthetic strip; and the drive wheel bring mounted to said housing rearwardly of the first guide-wheel element, the drive wheel being motor driven and having a circumferential channel adapted to receive and apply pressure to the central raised portion of the synthetic strip as the housing passes over the synthetic strip, and the drive wheel having flange-engaging circumferential edges adapted to engage and apply pressure to the flanges.

DETAILED DESCRIPTION OF THE INVENTION

Figure 1:
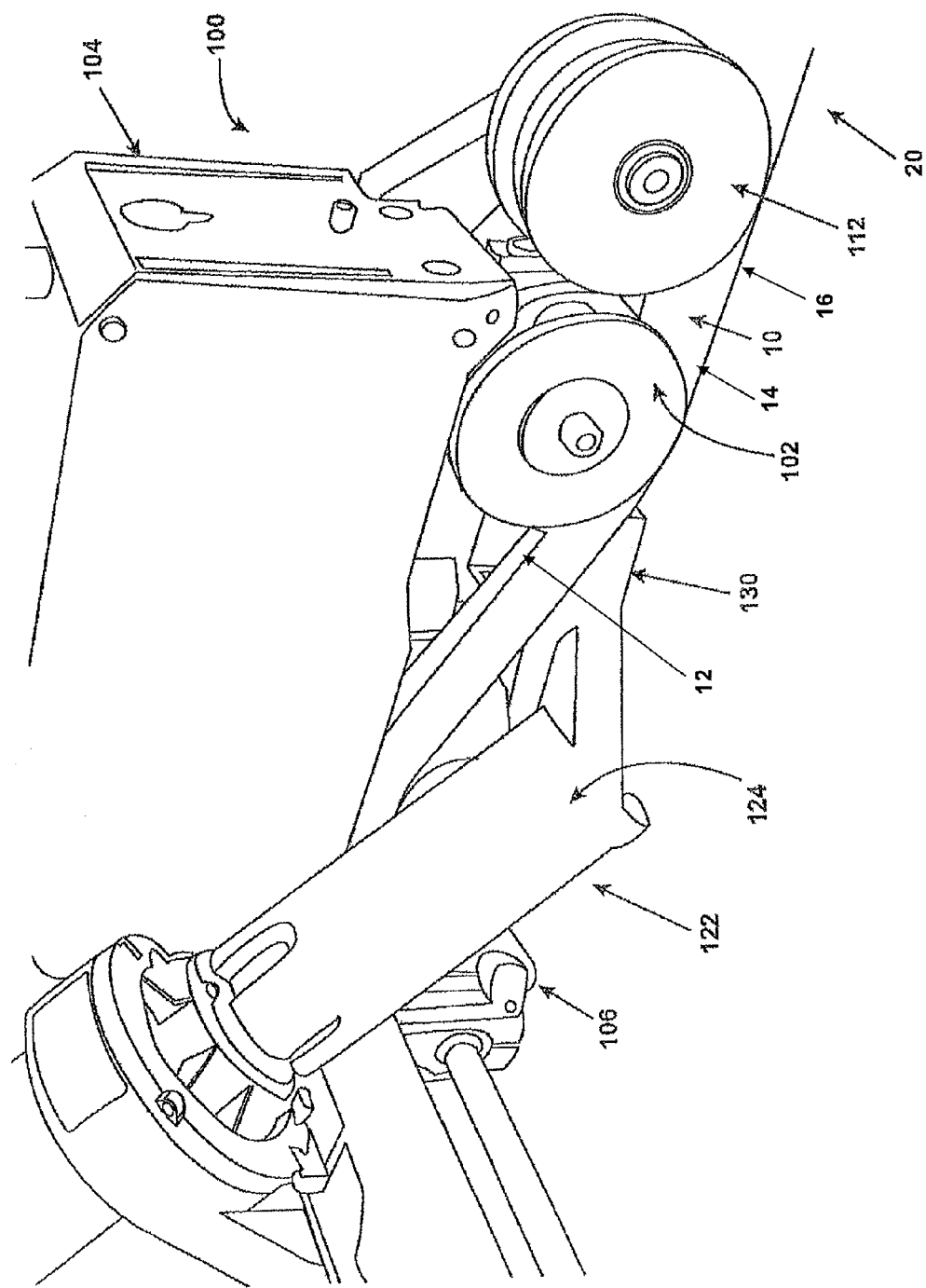
FIG. 1 is a perspective, generally side view of one form a self-propelled roofing apparatus of the present invention with heated air source.
Figure 2:
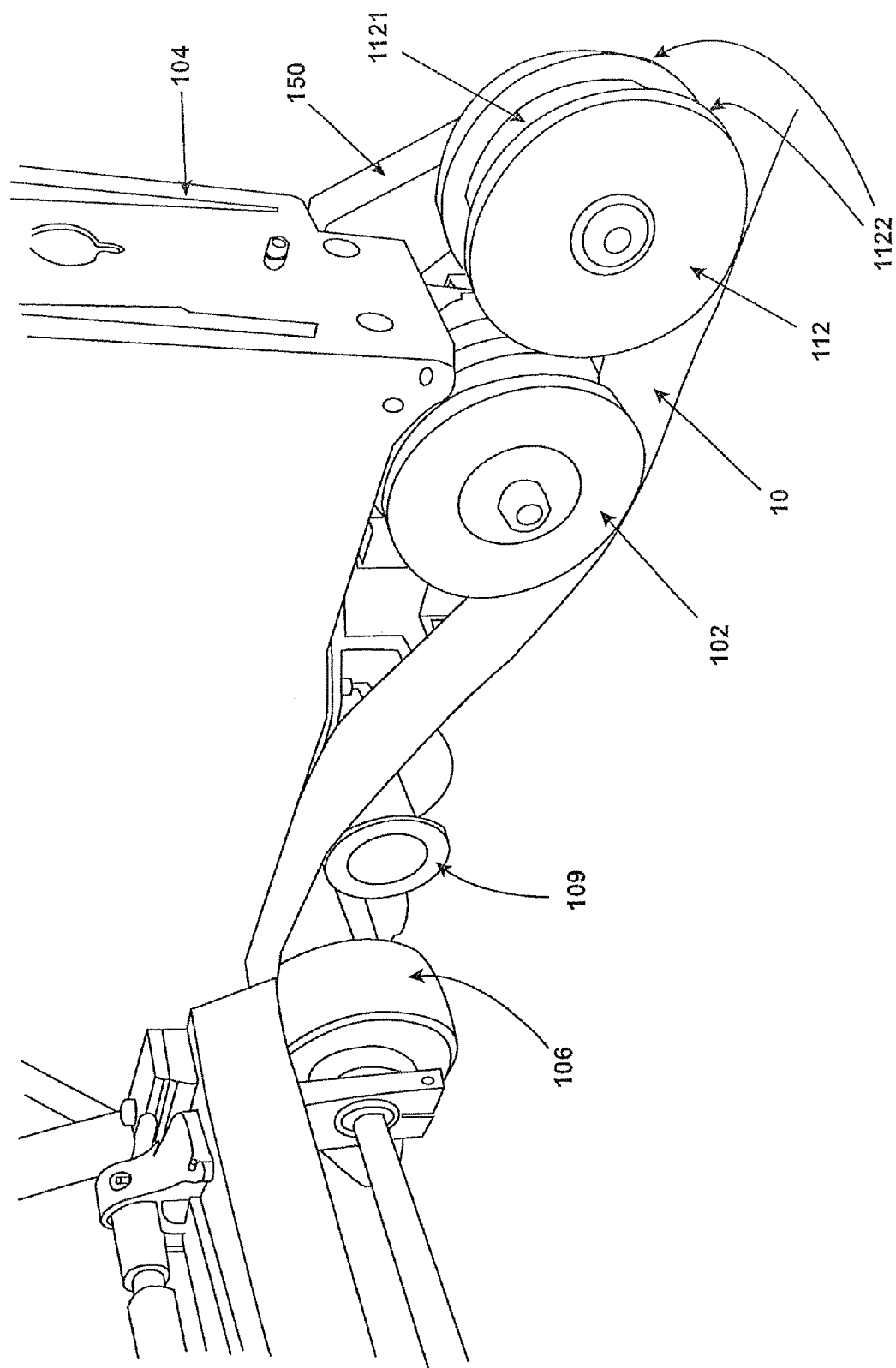
FIG. 2 is a perspective, generally side view of roofing apparatus of FIG. 1 without the heated air source.
Figure 3:
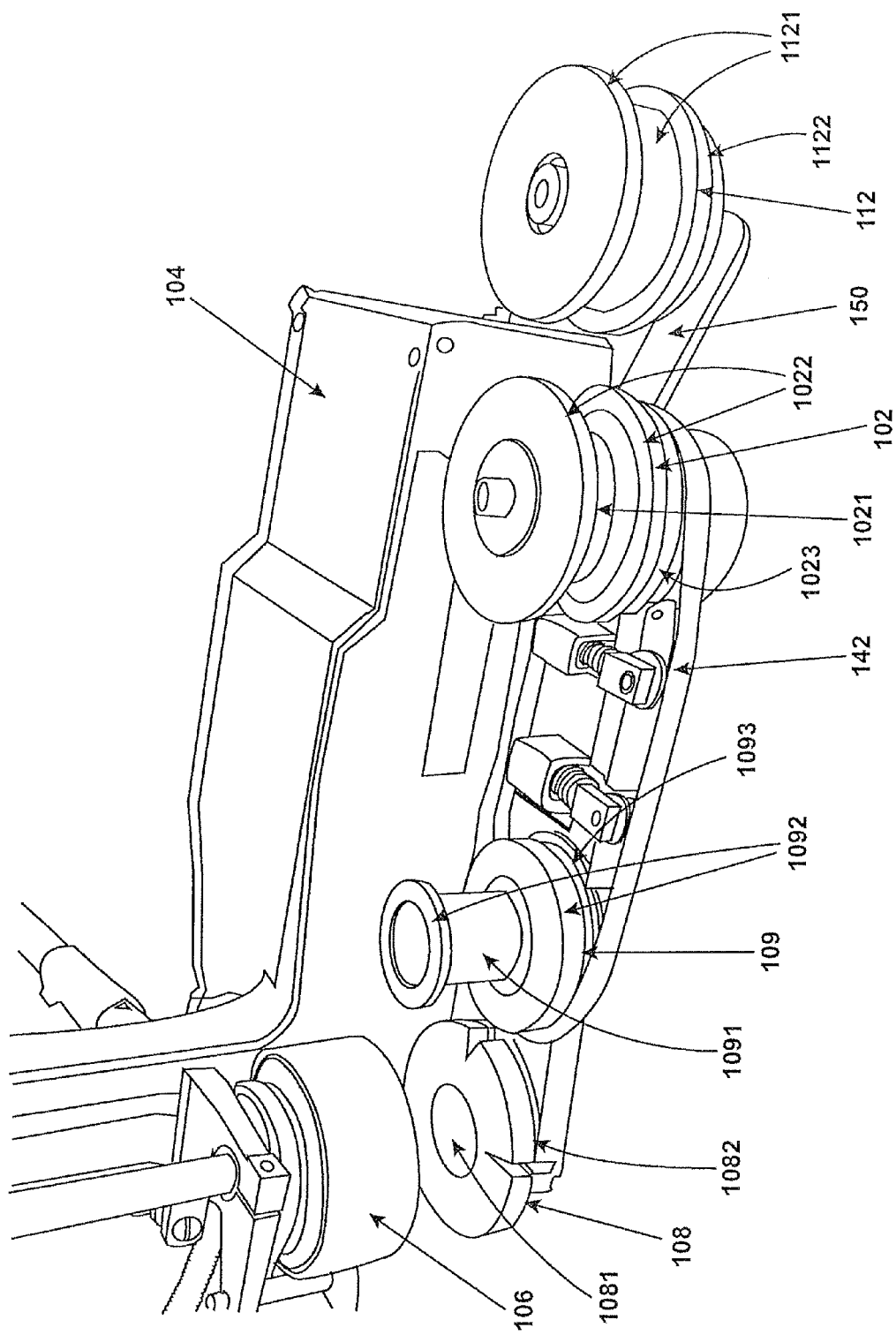
FIG. 3 is a perspective, generally bottom view of the roofing apparatus of FIG. 2.
Figure 4:
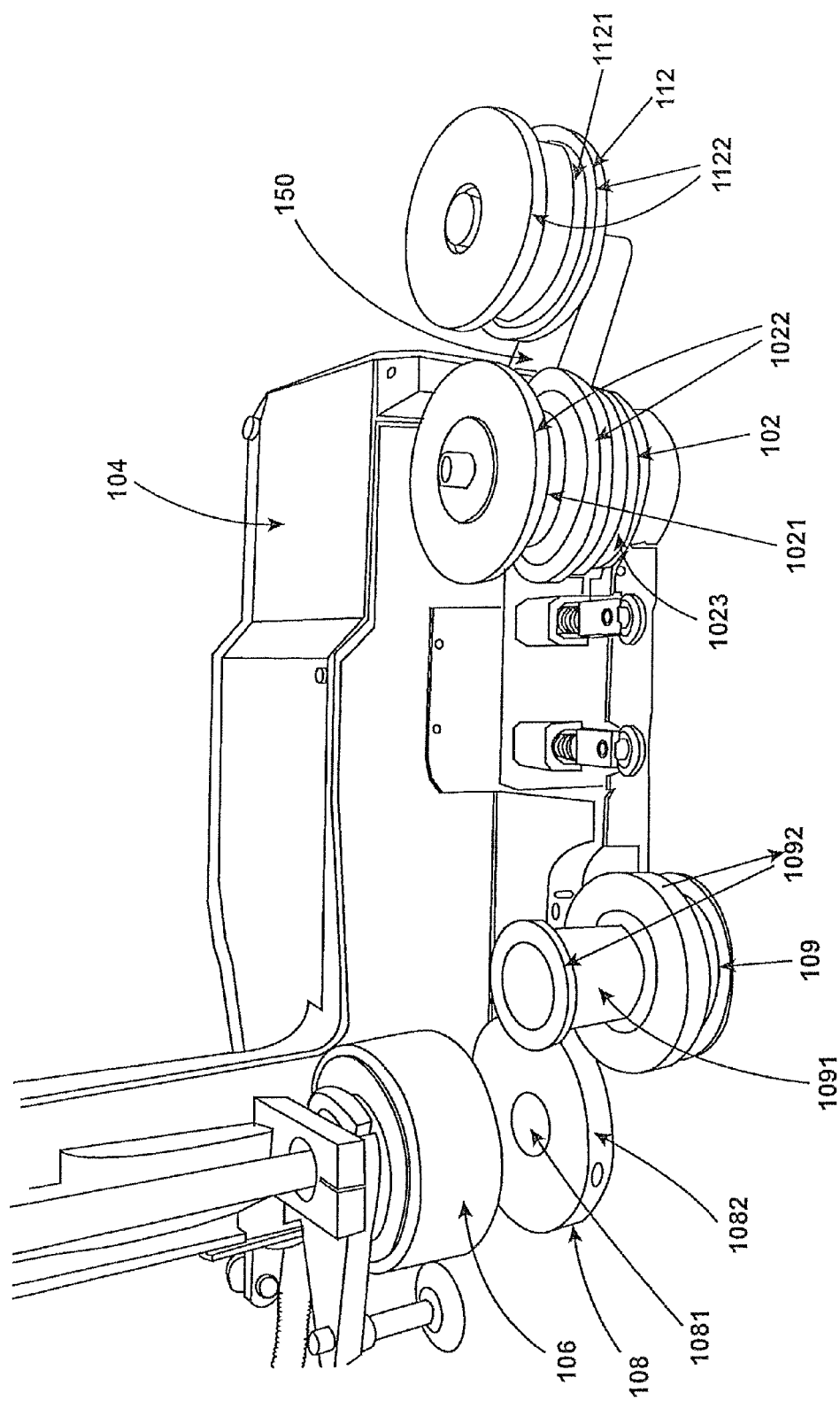
FIG. 4 is a bottom view of the roofing apparatus of FIG. 2.
Figure 5:
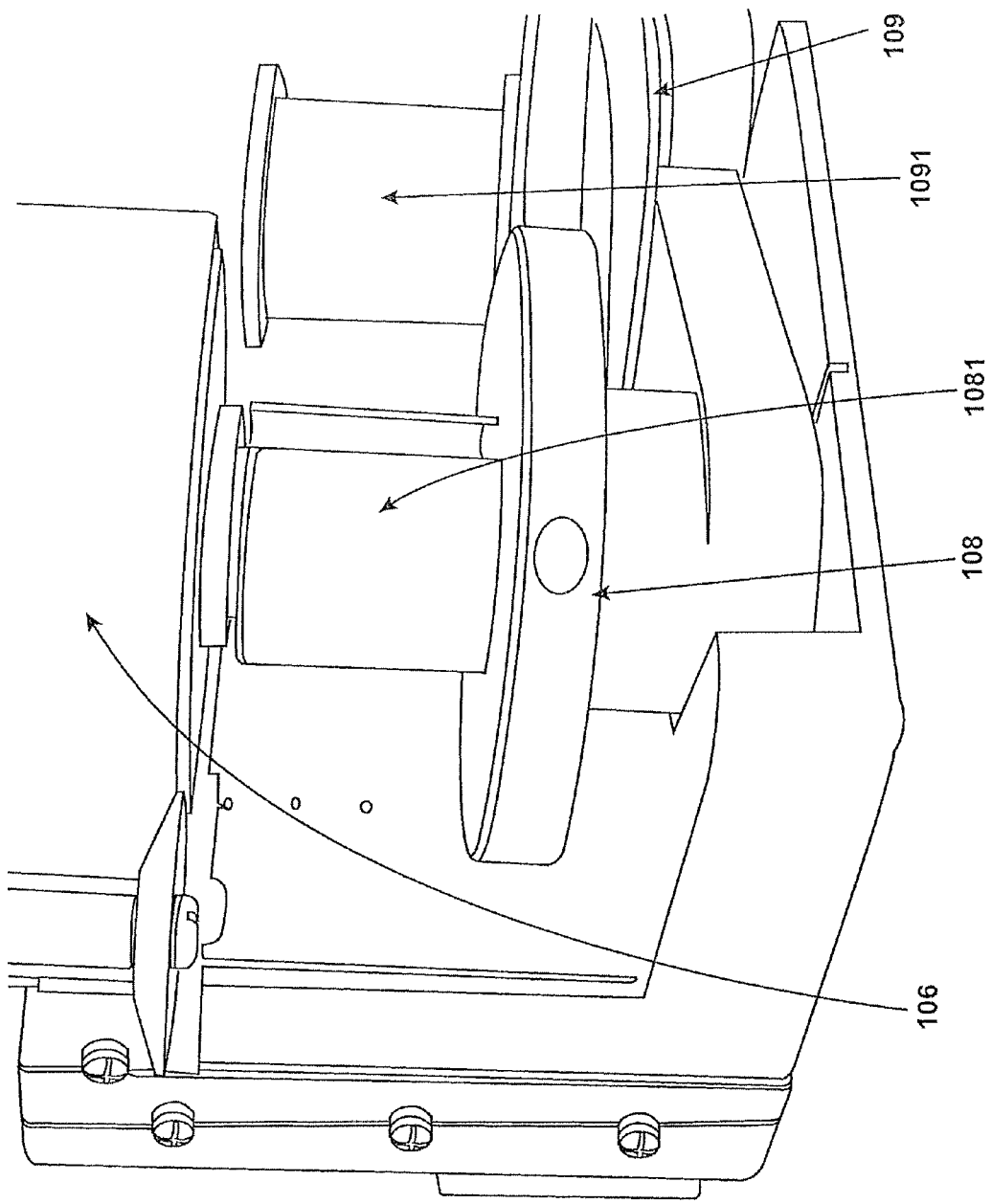
FIG. 5 is a close-up, generally bottom view of the real axel wheel, first- and second-guide wheel peripheral channel, and first- and second-guide wheel peripheral edge.
Figure 6:
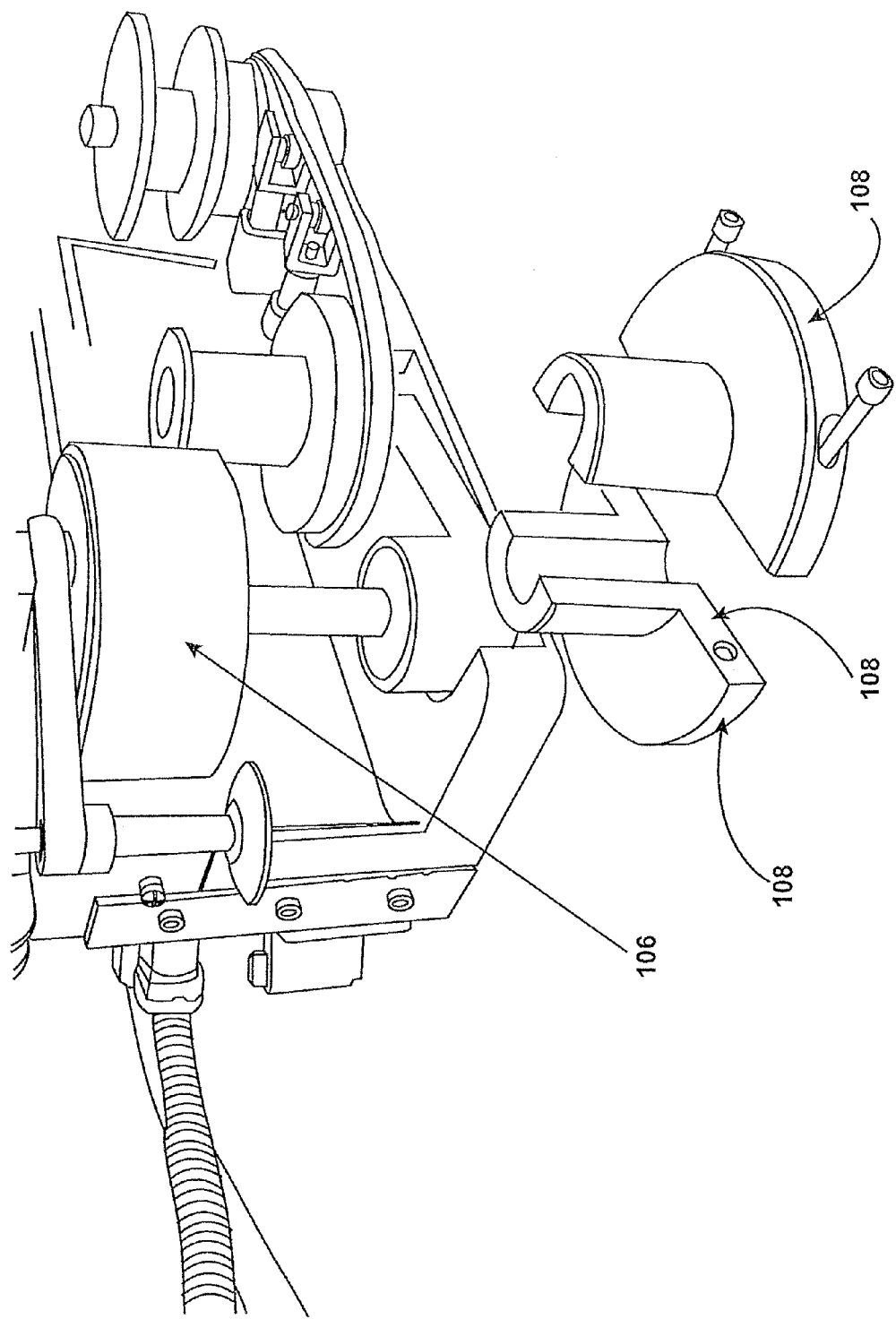
FIG. 6 is a perspective, generally bottom exploded view of the first guide wheel.
Figure 7:
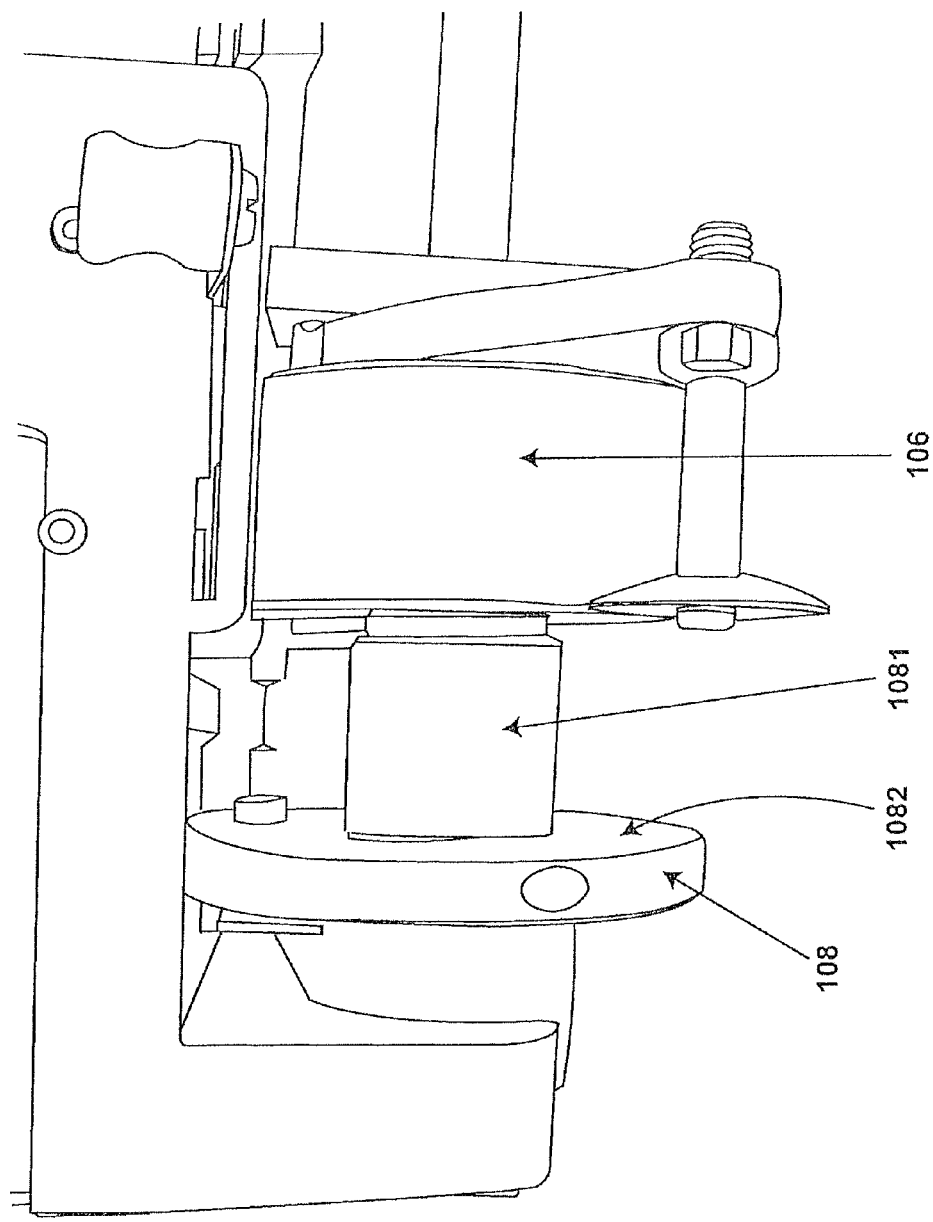
FIG. 7 is a generally side view of the roofing apparatus of FIG. 2.
Figure 8:
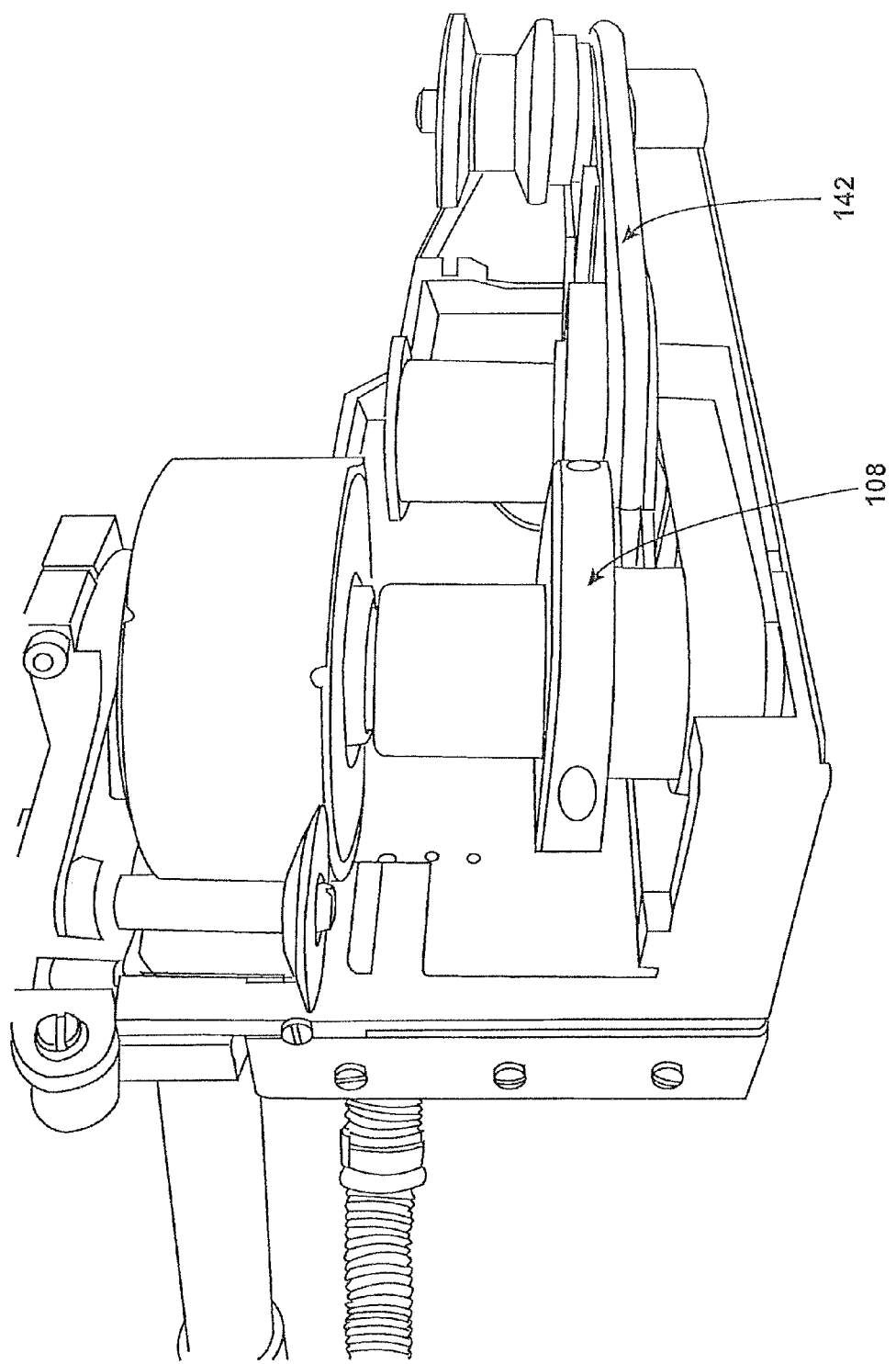
FIG. 8 is a perspective, generally side view of the first guide wheel and belt
Figure 9:
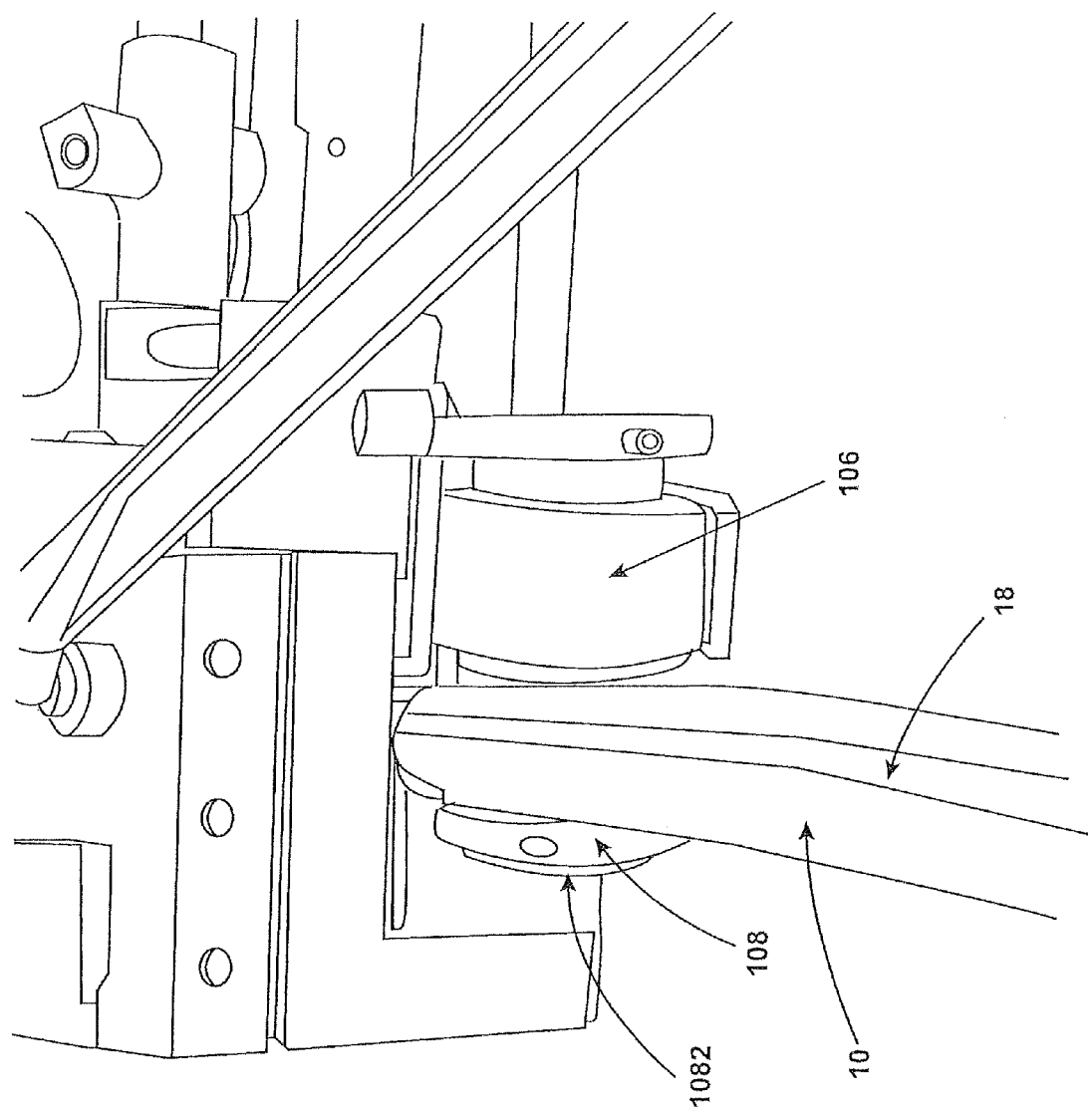
FIG. 9 is a top view of the roofing apparatus of FIG. 1 with synthetic strip inserted.
Figure 10:
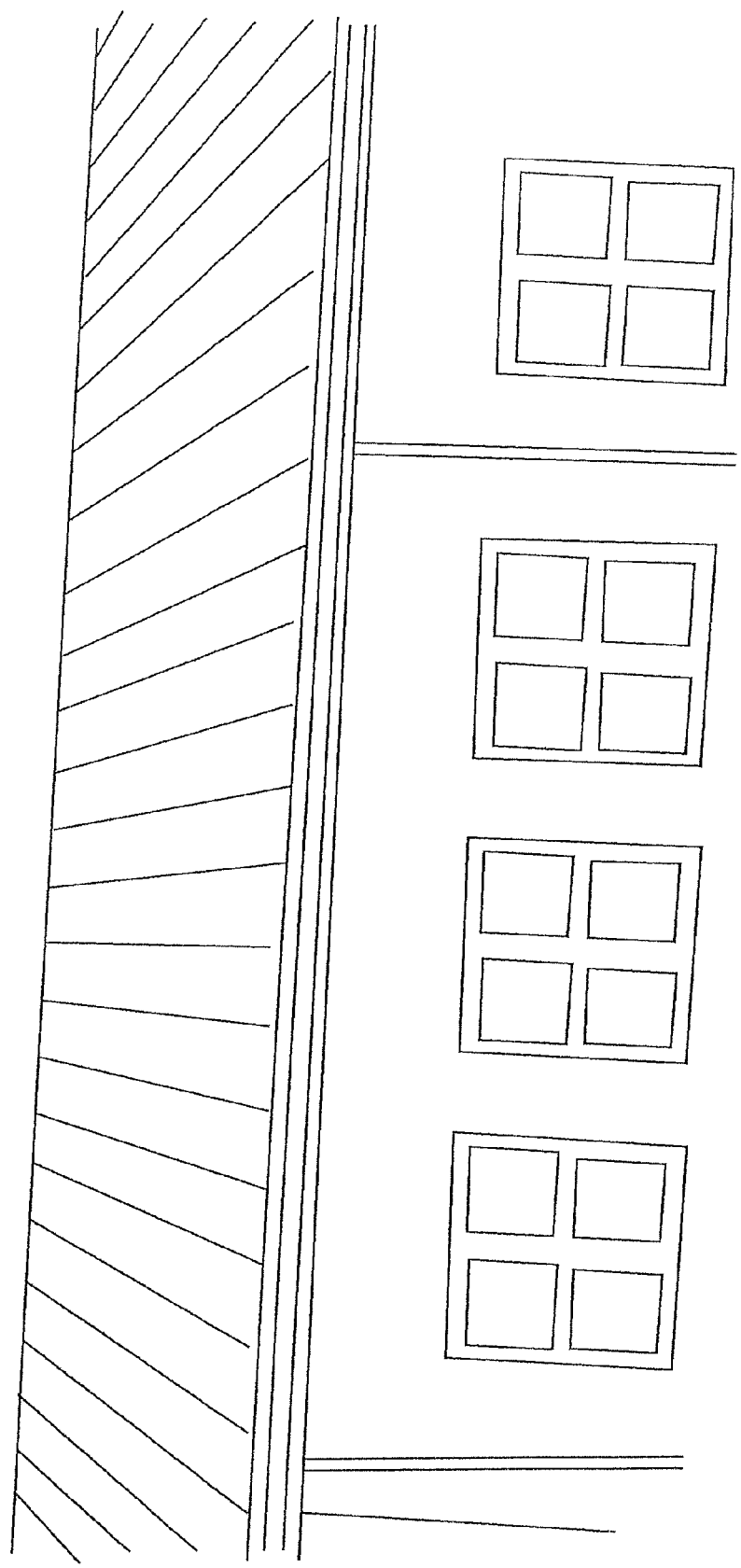
FIG. 10 is a perspective, generally side view of a roofing construction related to the invention.

Referring to the figures, embodiments are directed to roofing apparatus 100 that facilitates the welding of synthetic strip 10 to roofing membrane 20. Embodiments provide for synthetic strip 10 and roofing membrane 20 to be manufactured using plastic.

As shown in the figures, embodiments provide for synthetic strip 10 having a central raised portion 12 that extends in the longitudinal or lengthwise direction of synthetic strip 10. In an embodiment, central raised portion 12 has a central raised portion cross-sectional area 18 that is substantially triangular. Synthetic strip 10 further comprises flanges 14 that extend in a radial or widthwise direction from the base of central raised portion 12. Synthetic strip 10 further has membrane-engaging surface 16 that makes up the underside of synthetic strip 10. In embodiments, membrane-engaging surface 16 comes into contact with and is welded to roofing membrane 20. In an embodiment, the width of membrane-engaging surface 16 extends from the edge of a first flange 14 to the edge of a second opposing flange 14.

There is no limit to useful longitudinal lengths for synthetic strip 10. Persons of ordinary skill in the art will be able to select useful longitudinal lengths for synthetic strip 10 without having exercise undue experimentation.

Roofing membrane 20 can be any known type of roofing membrane manufactured from plastic and persons of ordinary skill in the art will be able to select roofing membranes manufactured from useful materials in light of the synthetic strip material to be welded to roofing membrane 20. useful roofing membranes include flat roofing membranes that can be bonded or welded to synthetic strip 10.

Embodiments provide for either self-propelled or non-self-propelled roofing apparatus 100 constructions. As a non-limiting example, and as shown in the figures, self-propelled embodiments utilize drive wheel 102 to move roofing apparatus 100. Drive wheel 102 can be powered by any kind of motor, including an electric motor, and persons of ordinary skill in the art will be able to select useful motor constructions without having to exercise undue experimentation.

As shown in the figures, roofing apparatus 100 has free-wheeling real axel wheel 106 that is relatively positioned at the front-end portion of housing 104. Roofing apparatus 100 also has first guide wheel 108 substantially adjacent to real axel wheel 106. First guide wheel 108 is positioned within or substantially underneath self-propelled housing 104. First guide wheel 108 has first-guide-wheel peripheral channel 1081 which is adapted to receive flanges 14 and membrane engaging surface 16. An embodiment provides for first guide wheel 108 and first-guide-wheel peripheral channel 1081 to be relatively positioned underneath flanges 14 when flanges 14 and membrane engaging surface 16 are received by first guide wheel 108. The width of first-guide wheel peripheral channel 1081 is defined by first-guide-wheel peripheral edge 1082 and the inner edge of real axel guide wheel 106.

Second guide wheel 109 is positioned rearwardly of first guide wheel 108 and has second guide wheel peripheral channel 1091 adapted to receive flanges 14 and membrane engaging surface 16. Embodiments provide for second guide wheel 109 to have second-guide-wheel peripheral edges 1092 adapted to define the width of second guide wheel peripheral channel 1091.

Drive wheel 102 is positioned rearwardly of second guide wheel 109 and has pressure wheel peripheral channel 1021 adapted to receive central raised portion 12. Drive wheel 102 has pressure wheel flange-engaging circumferential edges 1022 adapted to engage and apply pressure to flanges 14. Embodiments provide for drive wheel 102 being relatively positioned above synthetic strip 10 when synthetic strip 10 is received by drive wheel 102 such that drive wheel 102 is capable of exerting a downward force upon central raised portion 12 and flanges 14.

Cool down pressure wheel 112 is positioned rearwardly of drive wheel 102 and has cool-down-pressure-wheel peripheral channel 1121 adapted to receive central raised portion 12. Cool down pressure wheel 112 also has cool-down-pressure-wheel flange-engaging circumferential edges 1122 adapted to engage and apply downward pressure to flanges 14. In embodiments, cool down pressure wheel 112 is fixedly attached to arm 150, wherein the arm is attached to roofing apparatus 100 at a pivot point that allows cool down pressure wheel 112 to be pivotably engaged or disengaged such that it respectively applies pressure to flanges 14 when pivotably engaged or does not apply pressure to flanges 14 when pivotably disengaged. When pivotably engaged, embodiments provide for cool down pressure wheel 112 being relatively positioned above synthetic strip 10 when synthetic strip 10 is received by cool down pressure wheel 112 such that cool down pressure wheel 112 is capable of exerting a downward force upon central raised portion 12 and flanges 14.

In embodiments, continuous belt 142 wraps around second guide wheel 109 and drive wheel 102. Specifically, belt 142 fits into second-guide-wheel belt channel 1093 and drive-wheel belt cannel 1023. Belt 142 enables the coordinated rotation of second guide wheel 109 and drive wheel 102.

Roofing apparatus 100 has heated-air source 122 having nozzle 124 that directs heated-air flow to the point of contact between synthetic strip 10 and roofing membrane 20. An embodiment provides for heated air traveling from heated-air source through nozzle for directing heated air flow 124 and subsequently through substantially flat nozzle outlet end portion 130. Heated-air source 122 provides heat at an elevated temperature that enables the welding of synthetic strip 10 to roofing membrane 20. Welding is enabled by the heated air generated by heated-air source 122 in combination with pressure applied to synthetic strip 10 by drive wheel 102, cool down pressure wheel 112, or both. It is the combination of heat and pressure applied to both synthetic strip 10 and roving membrane 20 at their heated point of contact that enables the weld to occur.

Heated-air source 122 can be any commercially available heated air source, and persons of ordinary skill in the art will be able to determine useful heated air sources without having to exercise undue experimentation. The shape of the nozzle for directing heated air flow 124 is not limited to any particular shape so long as it transfers heated air to the point of contact between synthetic strip 10 and roofing membrane 20.

During operation, and in an embodiment, the path of synthetic strip 10 as it is guided through roofing apparatus 100 is as follows. Synthetic strip 10 is guided into roofing apparatus off the surface of roofing membrane 20 and into roofing apparatus by being received by first guide wheel peripheral channel 1081. First guide wheel peripheral channel 1081 is relatively positioned underneath synthetic strip 10. From first guide wheel peripheral channel 1081, synthetic strip 10 is then received by second guide wheel peripheral channel 1091. Second guide wheel peripheral channel 1091 is relatively positioned underneath synthetic strip 10. From second guide wheel peripheral channel 1091, synthetic strip 10 is then guided in a downwardly fashion towards roofing membrane 20 and heated by heated-air source 122 immediately before entering into pressure wheel peripheral channel 1021. Pressure wheel flange-engaging circumferential edges 1022 and pressure wheel peripheral channel 1021 then apply pressure to synthetic strip 10 in order to create a weld between synthetic strip 10 and sealing membrane 20. In an embodiment, synthetic strip 10 has subsequent pressure applied to it by cool down wheel flange-engaging circumferential edges 1122. The result is a weld between synthetic strip 10 and roofing membrane 20.

In an embodiment, a known commercial roofing welding apparatus that can be modified in order to create roofing apparatus 100 is LEISTER VARIMAT V2. LEISTER PROCESS TECHNOLOGIES has headquarters in Switzerland at Galileo-Strasse 10 CH-6056 Kaegiswil/Switzerland.

The teachings of U.S. Pat. No. 6,453,964 are hereby incorporated by reference.

What is claimed is:

1. An apparatus for welding a synthetic strip to a roofing membrane that is attached to a roofing construct, the synthetic strip having a central raised portion that extends along a longitudinal length of the synthetic strip, the synthetic strip having flanges extending widthwise from the central raised portion, and the synthetic strip having a substantially planar underside portion, the apparatus comprising:
   a self-propelled housing having a drive wheel for movably supporting the housing relative to a roofing membrane;
   a first guide-wheel element mounted to the housing and positioned in or underneath the housing and the first guide-wheel element having a peripheral channel adapted to engage and receive the planar underside portion of the synthetic strip and guide the synthetic strip, wherein the guide-wheel receiving channel has a channel width adapted to receive the total width of the synthetic strip;
   the drive wheel being mounted to said housing, the drive wheel being motor drive and having a circumferential channel adapted to receive and apply pressure downwardly against the central raised portion of the synthetic strip as the housing passes over the synthetic strip; and
   the drive wheel further comprising flange-engaging circumferential edges adapted to engage and apply pressure downwardly to the flanges of the synthetic strip.

2. The apparatus of claim 1, further comprising a heated-air source having a nozzle for conveying heated air to a location between the synthetic strip and the sealing membrane.

3. The apparatus of claim 1, further comprising a belt that engages the drive wheel and a second wheel having a synthetic strip receiving channel that is adapted to receive the underside of the synthetic strip as the housing passes over the synthetic strip.

4. The apparatus of claim 1 further comprising a second guide-wheel element mounted to the housing and positioned in or underneath the housing, the second guide-wheel element having a peripheral channel adapted to engage and receive the planar underside portion of the synthetic strip and guide the synthetic strip, wherein the second guide-wheel receiving channel has a channel width adapted to receive the total width of the synthetic strip.

5. The apparatus of claim 1 further comprising a heated air source with a nozzle, the nozzle located between the first guide wheel and the drive wheel and proximate to the synthetic strip, whereby the planar underside of the synthetic strip between the first guide wheel and the drive wheel is exposed to the nozzle.

6. An apparatus for welding a synthetic strip to a roofing membrane that is attached to a roofing construct, the synthetic strip having a central raised portion that extends along a longitudinal length of the synthetic strip, the synthetic strip having flanges extending widthwise from the central raised portion, and the synthetic strip having a substantially planar underside portion, the apparatus comprising:

a self-propelled housing having a drive wheel for movably supporting the housing relative to a roofing membrane;

a first guide-wheel element mounted to the housing and positioned in or underneath the housing and the first guide-wheel element having a peripheral channel adapted to engage and contact the planar underside portion of the synthetic strip and guide the synthetic strip, wherein the guide-wheel receiving channel has a channel width adapted to receive and contact the total width of the synthetic strip;

the drive wheel having flange-engaging circumferential edges adapted to engage and apply pressure to the flanges of the synthetic strip; and further comprising a heated-air source having a nozzle for conveying heated air to a location between the synthetic strip and the sealing membrane and between the first guide-wheel element and the drive wheel.

7. The apparatus of claim 6 further comprising a second guide-wheel element mounted to the housing and positioned in or underneath the housing, the second guide-wheel element having a peripheral channel adapted to engage and receive the planar underside portion of the synthetic strip and guide the synthetic strip, wherein the second guide-wheel receiving channel has a channel width adapted to receive the total width of the synthetic strip.

8. An apparatus for welding a synthetic strip to a roofing membrane that is attached to a roofing construct, the synthetic strip having a central raised portion that extends along a longitudinal length of the synthetic strip, the synthetic strip having flanges extending laterally from the central raised portion, and the synthetic strip having a substantially planar underside portion, the apparatus comprising:

a self-propelled housing having a drive wheel for movably supporting the housing on the membrane;

a first guide-wheel element mounted to the housing and positioned in or underneath the housing and the first guide-wheel element having a peripheral channel adapted to engage and contact the planar underside portion of the synthetic strip and guide the synthetic strip, wherein a width dimension of the channel is adapted to receive a total width of the synthetic strip;

the drive wheel being mounted to said housing rearwardly of the second guide-wheel element, the drive wheel being motor driven and having a circumferential channel adapted to receive and apply pressure to the central raised portion of the synthetic strip as the housing passes over the synthetic strip;

the drive wheel having flange-engaging circumferential edges adapted to engage and apply pressure to the flanges of the synthetic strip; and wherein the synthetic strip moves from a position on top of the first and second guide-wheels with the peripheral channels of the first and second guide wheels in contact with the planar underside portion of the synthetic strip to a position under the drive wheel with the circumferential channel of the drive wheel in contact with the central raised portion of the synthetic strip and the flange-engaging circumferential edges of the drive wheel in contact with the flanges of the synthetic strip.

9. The apparatus of claim 8 further comprising a cool down pressure wheel proximate to the drive wheel, the cool down pressure wheel further comprising a circumferential channel adapted to receive and apply pressure to the central raised portion of the synthetic strip as the cool down pressure wheel passes over the synthetic strip, and flange-engaging circumferential edges adapted to engage and apply pressure to the flanges of the synthetic strip.

\* \* \* \* \*